US007729011B2

(12) United States Patent
Harigai

(10) Patent No.: US 7,729,011 B2
(45) Date of Patent: Jun. 1, 2010

(54) COLOR ADJUSTMENT APPARATUS, COLOR ADJUSTMENT METHOD, COLOR-CONVERSION-PARAMETER GENERATING APPARATUS, COLOR CONVERSION PARAMETER GENERATION METHOD, COLOR CONVERTING APPARATUS, COLOR CONVERSION METHOD, COMPUTER READABLE MEDIUM AND DATA SIGNAL

(75) Inventor: Jungo Harigai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 845 days.

(21) Appl. No.: 11/634,956

(22) Filed: Dec. 7, 2006

(65) Prior Publication Data

US 2007/0242291 A1 Oct. 18, 2007

(30) Foreign Application Priority Data

Apr. 17, 2006 (JP) ............................ P2006-112954

(51) Int. Cl.
*G06F 15/00* (2006.01)
(52) U.S. Cl. ........................................ 358/1.9; 358/518
(58) Field of Classification Search .................. 358/518, 358/1.9
See application file for complete search history.

(56) References Cited

U.S. PATENT DOCUMENTS

| 5,390,035 | A  | * | 2/1995  | Kasson et al. ............... 358/518 |
| 5,450,216 | A  | * | 9/1995  | Kasson ........................ 358/518 |
| 5,539,540 | A  |   | 7/1996  | Spaulding et al. ........... 358/518 |
| 6,266,165 | B1 | * | 7/2001  | Huang et al. ................. 358/520 |
| 2002/0041288 | A1 | * | 4/2002  | Myers ......................... 345/602 |
| 2004/0263882 | A1 | * | 12/2004 | Ito et al. ...................... 358/1.9 |
| 2006/0188156 | A1 | * | 8/2006  | Kwak et al. .................. 382/167 |
| 2006/0244983 | A1 | * | 11/2006 | Zeng .......................... 358/1.9 |

FOREIGN PATENT DOCUMENTS

JP      2005-79620 A      3/2005

OTHER PUBLICATIONS

Chen et al., How to Get Color Data from an Output Profile, Packaging Engineering, vol. 26, No. 1, Dec. 31, 2005, p. 25-28 and 33.

* cited by examiner

*Primary Examiner*—Twyler L Haskins
*Assistant Examiner*—Michael Burleson
(74) *Attorney, Agent, or Firm*—Morgan, Lewis & Bockius LLP

(57) ABSTRACT

A color adjustment apparatus includes a pair generating section, a vector generating section, a weight calculating section, a synthesized-vector generating section and a color converting section. The pair generating section generates pairs of colors in a first color gamut and corresponding colors in a second color gamut. One of the pairs includes white in the first color gamut. The vector generating section generates plural vectors each connecting the color in the first color gamut and the color in the second color gamut, which belong to each generated pair. The weight calculating section calculates weights in accordance with distances between a color, which is to be processed and is in the first color gamut, and origins of the generated vectors. The synthesized-vector generating section applies each calculated weight to the corresponding vector to generate a synthesized vector. The color converting section converts the color to be processed using the synthesized vector.

37 Claims, 7 Drawing Sheets

COLOR ADJUSTMENT APPARATUS, COLOR ADJUSTMENT METHOD, COLOR-CONVERSION-PARAMETER GENERATING APPARATUS, COLOR CONVERSION PARAMETER GENERATION METHOD, COLOR CONVERTING APPARATUS, COLOR CONVERSION METHOD, COMPUTER READABLE MEDIUM AND DATA SIGNAL

BACKGROUND

1. Technical Field

This invention relates to an image processing art for forming an image in color reproduction roughly equivalent to an original image on a second image output device with using the original image created for the purpose of being output on a first image output device.

2. Related Art

At present, various types of color-devices such as a digital camera, a color scanner, a color printer, and a color display become prevalent and are used widely, and the market requirements for color are also considerably high. Particularly in a system used in DTP (desktop publishing), etc., the requirements for color are considerably high and CMS (color management system) in each device is indispensable. A print simulation color proofreading art of simulating printed color in printing on a printer for check using the CMS technology is becoming pervasive.

A paper white (ground color) reproducing art is an important art for print simulation. Various paper types exist as paper used in print, and the paper white reproducing art is an art of reproducing white color of paper. At present, the paper white reproducing art is roughly classified into three methods of relative conversion, reproduction of only absolute white, and absolute reproduction.

The relative conversion is an art of reproducing paper white of a printing machine with using paper white of a printer and is a method of shifting the whole colors together with the white. The feature of this art is that since the paper white of the printing machine is matched with the paper white of printer, even if the paper white of the printer is whiter than that of the printing machine, color cast over the whole printer output can be suppressed. Also, since other colors are also shifted as a whole along with the shift of the paper white, print simulation can be executed with the collective impression received from the output image being maintained. As a shortcoming, however, it is difficult to perform absolute color reproduction of the print colors. Thus, if the paper white of the printing machine and the paper white of the printer are largely different, a problem may arise in color reproduction because of the whole color shift.

The reproduction of only absolute white is to shift the paper white of a printing machine to the paper white of a printer as in the relative conversion. However, the reproduction of only absolute white keeps absolute color reproduction for colors other than the paper white so that the other colors of the printing chine is reproduced on the printer. In so doing, color cast at the time when the printer outputs can be suppressed as with the relative conversion. Also, the other colors are converted so that the other colors are matched the resultant colors in terms of absolute color measurement. Therefore, a serious problem does not arise in color reproduction as print simulation. As a shortcoming, however, tone jump in the vicinity of a white or the like is named as a problem since only white of the printing machine is shifted to white of the printer.

The absolute reproduction is a reproduction method of matching colors of a printing machine and those of the printer with each other in terms of color measurement. The color of paper white of the printing machine is also reproduced faithfully so that the paper white of the printing machine is matched with that of the printer in terms of color measurement match. Accordingly, color measurement match of the print completion state in print can be conducted and simulation in a state closer to the print completion can be conducted. As a shortcoming, however, absolute match is conducted for the paper white. Thus, color cast is found if the color reproduction of the printer is observed.

Thus, the respective paper white reproduction arts have the merits and the demerits, and any of the reproduction arts is selected in accordance with purpose and the feature of each color reproduction. An art with higher color reproduction accuracy is required in the use of the print simulation as described above. Thus, the absolute reproduction is often selected. However, color cast, which colors on the whole paper plane as described above, occurs even when print simulation is executed. Thus, an art of lessening the color cast and providing high color reproduction accuracy is demanded.

Color gamut compression processing is executed to convert such a color outside the color reproduction area into a reproducible color. However, there is a possibility that this processing causes gradation compression or significant color difference may occur.

SUMMARY

According to an aspect of the invention, a color adjustment apparatus includes a pair generating section, a vector generating section, a weight calculating section, a synthesized-vector generating section and a color converting section. The pair generating section generates plural pairs of plural colors in a first color gamut and plural colors in a second color gamut, which correspond to the colors in the first color gamut, respectively. One of the pairs includes white in the first color gamut. The vector generating section generates plural vectors each connecting the color in the first color gamut and the color in the second color gamut, which belong to each generated pair. The weight calculating section calculates weights in accordance with distances between a color, which is to be processed and is in the first color gamut, and origins of the generated vectors. The synthesized-vector generating section applies each calculated weight to the corresponding vector to generate a synthesized vector. The color converting section converts the color to be processed into a color in the second color gamut, with using the synthesized vector.

BRIEF DESCRIPTION OF THE DRAWINGS

Exemplary embodiments of the invention will be described in detail below with reference to the accompanying drawings wherein.

DETAILED DESCRIPTION

Figure 1:
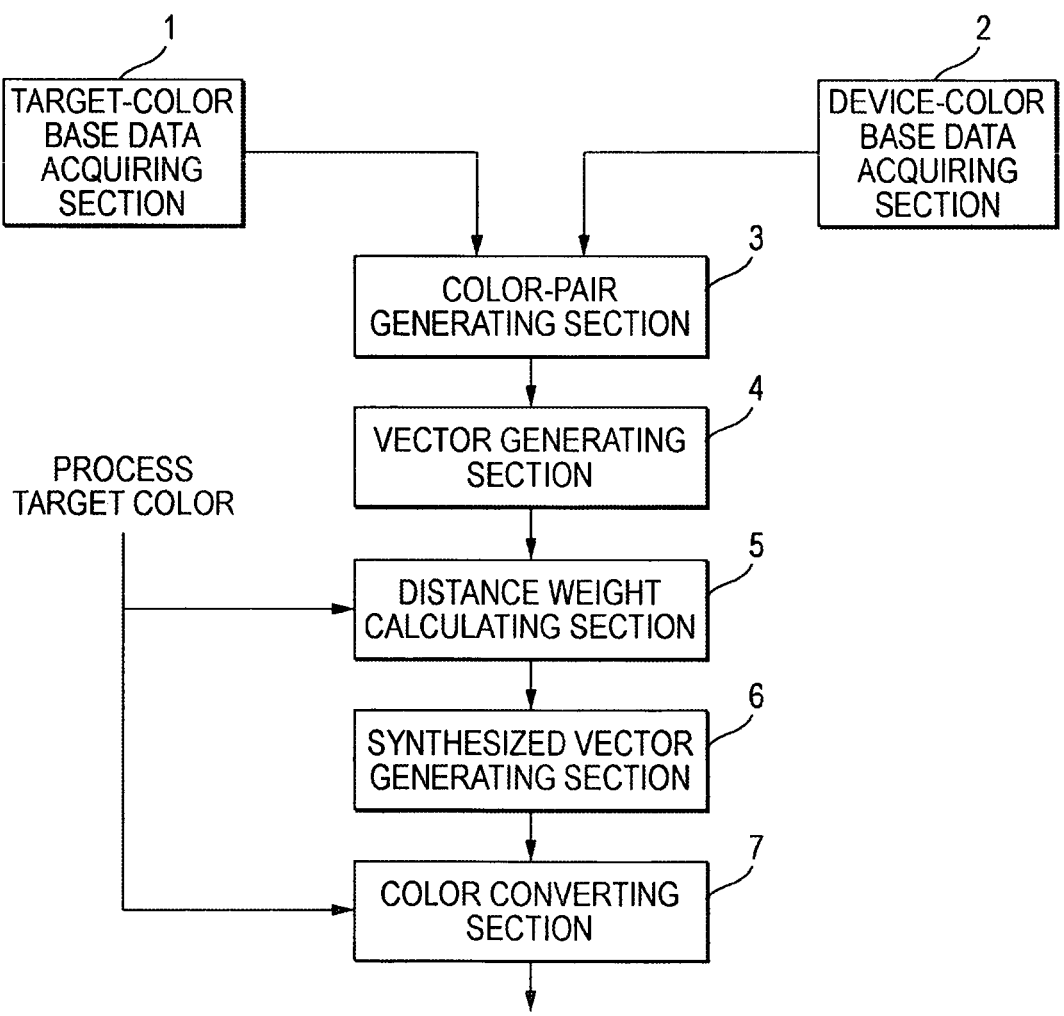
FIG. 1 is a block diagram to show a color adjustment apparatus and a color adjustment method according to an exemplary embodiment of the invention.

FIG. 1 is a block diagram to show a color adjustment apparatus and a color adjustment method according to an exemplary embodiment of the invention. In FIG. 1, numeral 1 denotes a target-color base data acquiring section, numeral 2 denotes a device-color base data acquiring section, numeral 3 denotes a color-pair generating section, numeral 4 denotes a vector generating section, numeral 5 denotes a distance weight calculating section, numeral 6 denotes a synthesized vector generating section and numeral 7 denotes a color converting section. Here, it is assumed that an image output by a first image output device, which is a target of color reproduction of the image, is reproduced with a second image output device. For example, the first image output device is a printing machine, and the second image output device is a printer. The exemplary embodiment may be used in such a manner that an image printed by the printing machine is simulated with the printer. Of course, it is needless to say that the invention is not limited to the use. A color reproduction area of the first image output device will be referred to as a "first color gamut," and a color reproduction area of the second image output device will be referred to as a "second color gamut."

The target-color base data acquiring section 1 acquires target-color base data, which describes the output characteristic of the first image output device. The target-color base data may be one, which describes a correspondence relation between first device-dependent input data and output data in a device-independent or device-dependent color space, which the first image output device outputs in response to the first device-dependent input data. For example, a color patch is output by the first image output device and may be paired with color measurement data obtained by measuring the output color patch to generate the target-color base data. When the first image output device is a printing machine, the color patch is formed based on CMYK color space data, for example. However, the color patch is not limited thereto. When the first image output device is a display, the color patch may be formed based on RGB color space data, for example. Likewise, the color measurement data generally is device-independent color space data such as L*a*b color space and XYZ color space. The color measurement data may be any value, which can specify respective colors. For example, when an image is read by a scanner or a digital camera, the color measurement data is RGB color space data. Further, the target-color base data can also be acquired from ICC profile information of the first image output device, contour data of a color reproduction area separately prepared.

The device-color base data acquiring section 2 acquires device-color base data, which describes the output characteristic of the second image output device. The device-color base data may be one, which describes a correspondence relation between second device-dependent input data and output data in a device-independent or device-dependent color space, which the second image output device outputs in response to the second device-dependent input data. For example, a color patch is output by the second image output device and may be paired with color measurement data obtained by measuring the output color patch to generate the device-color base data. When the second image output device is a printer, the color patch is formed based on CMYK color space data, for example. However, the color patch is not limited thereto. The color patch may be formed based on RGB color space data, for example. Likewise, the color measurement data generally is device-independent color space data such as L*a*b color space and XYZ color space or device-dependent color space data such as RGB color space. The color measurement data may be any value, which can specify respective colors. Further, the device-color base data can also be acquired from ICC profile information of the second image output device, contour data of a color reproduction area separately prepared.

The color-pair generating section 3 generates plural pairs of plural colors in the first color gamut and plural colors in the second color gamut, which correspond to the colors in the first color gamut, respectively, based on the target-color based data obtained by the target-color base data acquiring section 1 and the device-color base data obtained by the device-color base data acquiring section 2. It is noted that one of the pairs includes white in the first color gamut. Particularly, if a color conversion, which converts white in the first color gamut into white in the second color gamut, converts one of the colors in the first color gamut, which belong to the generated pairs, into a color outside the second color gamut, the color-pair generating section 3 generate a pair of the one of the colors in the first color gamut and a intersection between (i) a segment connecting the one of the colors in the first color gamut and the color into which the one of the colors in the first color gamut is converted and (ii) a contour of the second color gamut.

The generated pairs other than the pair including white in the first color gamut may include: (1) a pair of a black in the first color gamut and a color in the second color gamut, which corresponds to black in the first color gamut; (2) a pair of each color on the contour of the first color gamut and a color on the contour of the second color gamut, which corresponds to each color on the contour of the first color gamut; (3) a pair of a skin color or a sky blue in the first color gamut and a color in the second color gamut, which corresponds to the skin color or the sky blue in the first color gamut; (4) a pair of a primary color having the maximum saturation, a secondary color having the maximum saturation or process black in the first image output device and a color for a primary color, a secondary color or process black in the second image output device, which corresponds to the primary color having the maximum saturation, the secondary color having the maximum saturation or the process black in the first color gamut. The color-pair generating section 3 may be configured to allow a user to designate some or all of the color pairs, instead of generating the color pairs using the target-color base data and the device-color base data.

The vector generating section 4 generates a "correspondence-color vector," which is a color correction direction vector, for each of the color pairs generated by the color-pair generating section 3.

The distance weight calculating section 5 calculates weights in accordance with a distance between a color, which is to be converted in the first color gamut, and origins of the correspondence-color vectors generated by the vector generating section 4.

The synthesized vector generating section 6 applies each weight calculated by the distance weight calculating section 5 to the correspondence-color vector, which is generated by vector generating section 4 and corresponds to each weight, and then synthesizes the resultant vectors to generate a synthesized vector.

The color converting section 7 converts the color to be converted in the first color gamut into a color in the second color gamut, using the synthesized vector generated by the synthesized vector generating section 6.

Next, an operation example of the color adjustment apparatus and the color adjustment method according to the exemplary embodiment of the invention will be described. At first, the target-color base data acquiring section 1 acquires the target-color base data of the first image output device, which is a color reproduction target. The device-color base data acquiring section 2 acquires the device-color base data of the second image output device, which actually outputs an image.

The color-pair generating section 3 generates color pairs, which associate the colors in the first color gamut with the colors in the second color gamut, based on the acquired target-color base data and the acquired device-color base data. At this time, the color-pair generating section 3 generates the color pairs so that the generated color pairs always contain a color pair, which associates white in the first color gamut and white in the second color gamut with each other. According to the thus generated color pairs, paper white in the first image output device is converted into paper white in the second image output device. Therefore, color reproduction with no color cast can be realized as with the relative conversion. In addition to the paper whites, the color-pair generating section 3 may generate color pairs for various colors.

Figure 2:
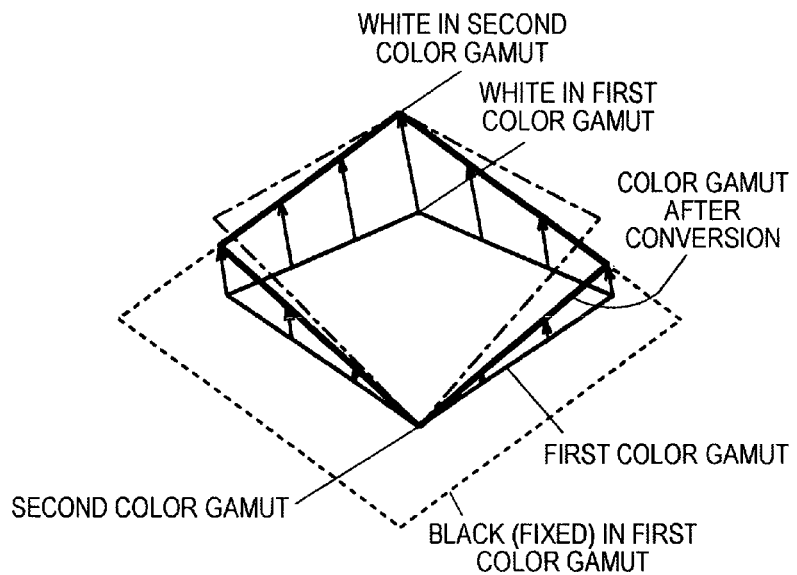
FIG. 2 is a schematic representation of an example of color pairs generated by a color-pair generating section 3 of the color adjustment apparatus and the color adjustment method according to the exemplary embodiment of the invention.

FIG. 2 is a schematic representation of an example of the color pairs generated by the color-pair generating section 3 of the color adjustment apparatus and the color adjustment method according to the exemplary embodiment of the invention. In FIG. 2, the color gamuts are shown in a simplified manner. The solid thin line indicates the first color gamut, and the dashed line indicates the second color gamut. The first and second color gamuts can be obtained from the target-color base data and the device-color base data, respectively. The alternate long and short dash line indicates a color reproduction area obtained by moving (shifting) the color reproduction area of the first image output device according to the relative conversion of the related art.

In the example shown in FIG. 2, a black in the first color gamut is fixed (the corresponding color in the second color gamut is set to a color in the second color gamut to reproduce the same color as the black in the first color gamut). Also, color pairs are generated so that a contour of the first color gamut for colors up to the secondary colors coincides with a contour of the second color gamut.

A specific example of the method for generating the color pairs will be described. At first, the color-pair generating section 3 associates the primary and secondary color, which have maximum saturations, of the first image output device with the primary and secondary colors of the second image output device, which correspond to the primary and secondary color, which have maximum saturations, in the first image output device. For example, the color-pair generating section 3 associates a single color C (cyan) 100% of the first image output device with a single color C 100% of the second image output device. It is not necessary that the color, which has the maximum saturation, in the first color gamut is associated with a color, which has the maximum saturation, of the second image output device. For example, the color-pair generating section 3 may determine a value of the single color C of the second image output device based on the first color gamut so that the maximum saturations of the first image output device is maintained in the second image output device. As another example, if the relative conversion converts a color having the maximum saturation into a color outside the second color gamut, the color-pair generating section 3 may associates an intersection between a segment connecting the colors before and after the relative conversion and the contour of the second color gamut as the corresponding color in the second color gamut. The other example is shown in FIG. 2. As still another example, with regard to the colors having the maximum saturations, the color-pair generating section 3 may obtain colors corresponding to the colors, which have the maximum saturations, of the first image output device based on a relation between the maximum saturations in the first color gamut and the maximum saturations in the second color gamut, for example, a ratio therebetween. Further, with regard to the colors on the contour of the first color gamut, the color-pair generating section 3 may obtain colors on the contour of the second color gamut so that respective color differences therebetween become minimum, and then associate the colors on the contour of the first color gamut with the thus obtained colors on the contour of the second color gamut. Of course, the colors may be associated using any other method. Also, a user may be allowed to designate respective color pairs.

In this way, the color-pair generating section 3 associates the primary and secondary colors, which have the maximum saturations, of the first image output device with the corresponding colors of the second image output device to thereby generate the color pairs. Accordingly, white originally included in the generated color pairs, fixed black and six primary and secondary colors having the maximum saturations (CMYRGB) form a rough hexahedron. It is advisable to further generate color pairs including colors on sides and planes of the rough hexahedron.

Figure 3:
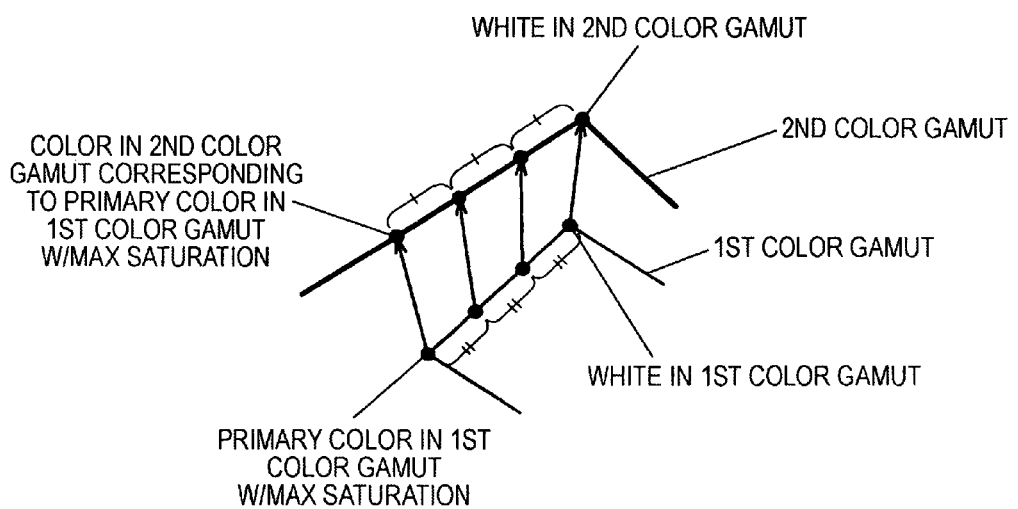
FIG. 3 is a schematic representation of an example of generating color pairs about colors other than the primary colors having the maximum saturations.

FIG. 3 is a schematic representation of an example of generating color pairs about colors other than the primary colors having the maximum saturations. FIG. 3 shows the example in which two color pairs are generated between white and a primary color (CMY) having the maximum saturation. In this example, a region between white in the first color gamut and the primary color having the maximum saturation is divided at regular intervals. Likewise, a region between white in the second color gamut and a color in the second color gamut corresponding to the primary color having the maximum saturation is divided at regular intervals. Thereby, color pairs are generated to associate the corresponding colors with each other.

Any number of color pairs can be generated as desired. However, about 10 divisions are desirable considering the accuracy and the calculation time. Also, it is not necessary to divide at regular intervals. With regard to the associated colors, it is not necessary to divide the first color gamut and the second color gamut in a similar manner. FIG. 3 shows an example of the primary colors. Color pairs may be generated in a similar manner on the sides and planes of the rough hexahedron described above.

Of course, color pairs may be generated not only for colors on the contour of the color gamut, but also for colors in the color gamut. There is a case where it may be concerned that the color conversion accuracy in the color gamut would be degraded if the color pairs only include colors on the contours of the respective color gamuts. Particularly, the gray axis is a very important portion on accuracy and may be required to enhance accuracy. Therefore, it is advisable to generate color pairs including colors on the gray axis. With regard to process black, a color pair may be generated independently from black. A color, which has the maximum density and is set as process black, is placed inside the rough hexahedron made up of white, black and the primary and secondary colors having the maximum saturation so as to prevent a defect in gradation property and tone jump from occurring.

In addition, color pairs for colors such as skin color, sky blue, and green may also be generated in a similar manner. This is because those colors are important in color difference accuracy. Thereby, it becomes possible to adjust (convert) those colors more accurately. However, if the number of the color pairs is increased, the calculation amount grows in the subsequent processing. Thus, the cost taken for color adjustment processing is increased. Therefore, with regard to the color pairs in the color gamuts, it is necessary to consider the tradeoff between the accuracy and the processing cost.

The vector generating section 4 generates the correspondence-color vector, which indicates the color correction direction to reproduce paper white, based on each of the color pairs generated by the color-pair generating section 3. That is, the vector generating section 4 generates the correspondence-color vector having (i) the color in the first color gamut, which belongs to each generated color pair, as an origin of the vector and (ii) the color in the second color gamut, which belongs to each generated color pair, as an end point of the vector.

Figure 4:
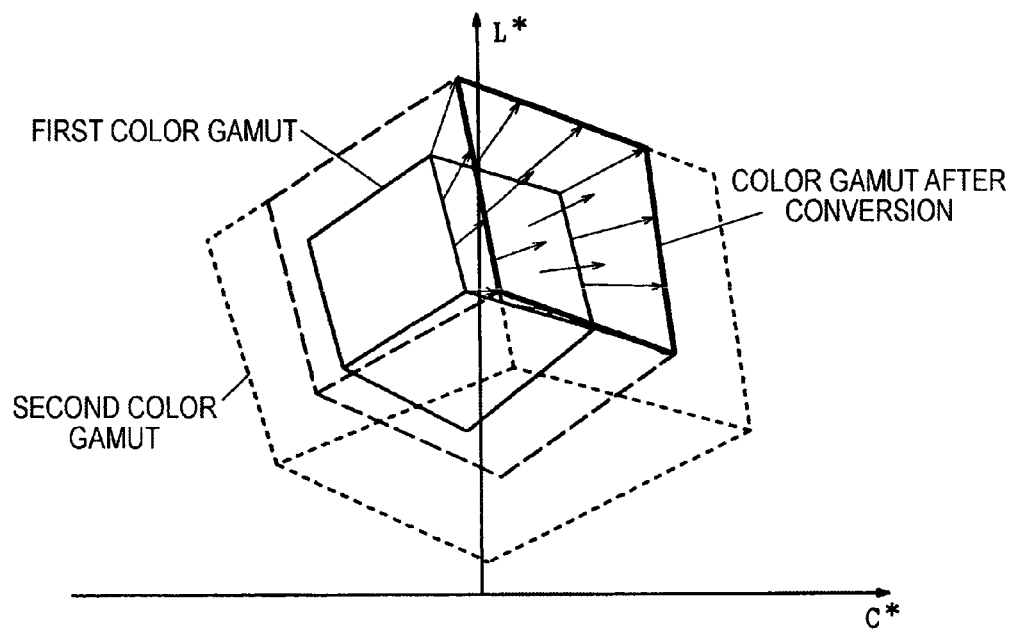
FIG. 4 is a schematic representation of an example of correspondence-color vectors.

FIG. 4 is a schematic representation of an example of correspondence-color vectors. FIG. 4 shows several correspondence-color vectors relating to one plane of the rough hexahedron made up of white, black, and the primary and secondary colors having the maximum saturations. As to one side of the rough hexahedron, for example, the arrows shown in FIG. 3 represent the correspondence-color vectors.

Subsequently, with respect to a color to be adjusted (converted) in the first color gamut, the distance weight calculating section 5 calculates a weight for each of the correspondence-color vectors generated by the vector generating section 4. The distance on the color space (color difference) is adopted as a parameter of the weights. This means that a weight coefficient, which is determined in accordance with a distance from the color to be adjusted (converted) to the origin of each correspondence-color vector, is assigned to each correspondence-color vector.

Figure 5:
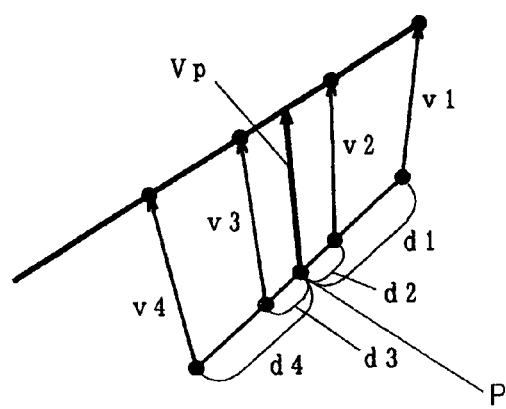
FIG. 5 is a schematic representation of an example of processing of calculating weight coefficients executed by a distance weight calculating section 5.
Figure 6:
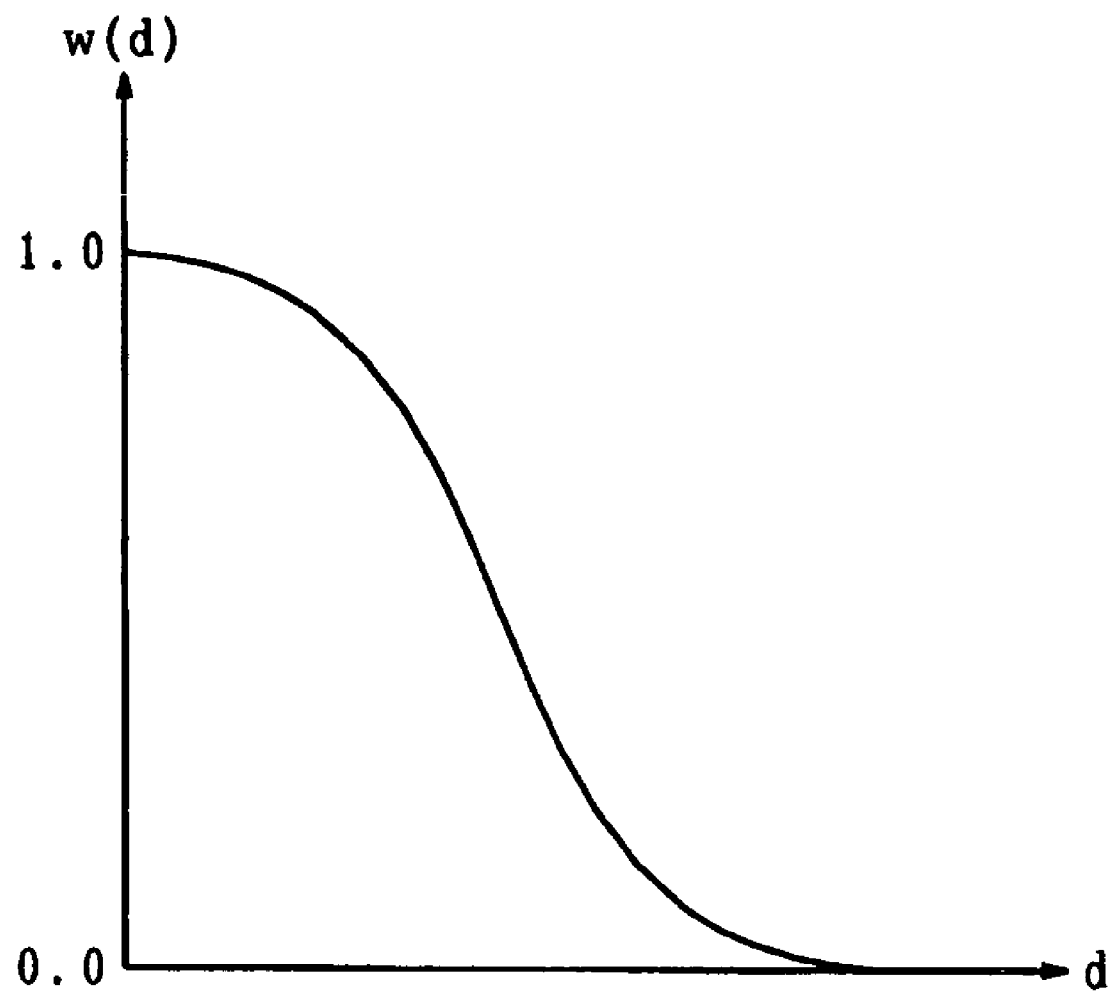
FIG. 6 is a graph showing an example of a relationship between a distance and a weight coefficient value.

FIG. 5 is a schematic representation of an example of processing of calculating weight coefficients executed by the distance weight calculating section 5. FIG. 6 is a graph showing an example of a relationship between the distance and the weight coefficient value. In the example shown in FIG. 5, correspondence-color vectors v1 to v4 are generated from the color pairs shown in FIG. 3. A color P is adopted as a process target color. The distance weight calculating section 5 calculates the distance weight for each correspondence-color vector based on the distance from the process target color P to the origin of the each correspondence-color vector.

The weight coefficient responsive to the distance may be obtained according to a function, for example, as shown in FIG. 6. The function w(d) shown in FIG. 6 can be given, for example, as $$w(d) = \frac{1.0}{(1.0 + d)^y}$$

That is, if a color itself belonging to a certain color pair is converted, the distance between the correspondence-color vector generated from the certain color pair and the process target color is equal to 0 and the maximum weight coefficient is assigned to the correspondence-color vector. In contrast, the distances from the process target color to the other correspondence-color vectors are larger and thus, very small weight coefficients are assigned to the other correspondence-color vectors. The parameter y is defined as distance dependency, namely, the larger the parameter value, the more sensitive to the distance d. Of course, the function for obtaining the weight coefficient is not limited to this function. The weight coefficient may be obtained according to any method other than this function.

Subsequently, the synthesized vector generating section 6 generates a synthesized vector Vj at the process target color based on the correspondence-color vectors generated by the vector generating section 4 and the distance weight coefficients calculated by the distance weight calculating section 5, which correspond to the respective correspondence-color vectors. That is, $$V_j = \sum_i w(d_i) \cdot v_i$$

where $v_i$ represents each correspondence-color vector and $V_j$ represents the synthesized vector.

In the example shown in FIG. 5, it is assumed that the distances from the process target color P to the correspondence-color vectors v1 to v4 are d1 to d4. Also, it is assumed that the distance weight calculating section 5 obtains w(d1) to w(d4) as the distance weight coefficients corresponding to the correspondence-color vectors v1 to v4. In this case, a synthesized vector $V_P$ of the process target color P can be obtained as $$V_P = w(d_1) \cdot v_1 + w(d_2) \cdot v_2 + w(d_3) \cdot v_3 + w(d_4) \cdot v_4$$

The thick line in FIG. 5 indicates the synthesized vector Vp.

When the synthesized vector generating section 6 thus generates the synthesized vector, the color converting section 7 performs conversion processing for the color to be converted based on the synthesized vector. Accordingly, colors in the first color gamut can be adjusted (converted) to colors in the second color gamut while white in the first color gamut, which is the color gamut of the first image output device, and white in the second color gamut, which is the color gamut of the second image output device, coincide with each other. For example, also shown in FIG. 2, the colors in the first color gamut indicated by the thin solid line are converted into the colors in the second color gamut indicated by the thick solid line. At this time, unlike the relative conversion of the related art, the adjusted (converted) color is not placed outside the second color gamut. Also, white becomes paper white. Therefore, color cast can be prevented and natural color reproduction suited to the characteristic of the image output device is made possible. Since black is fixed, the second color gamut can be utilized effectively.

The calculation of the weight coefficients for the correspondence-color vectors executed by the distance weight calculating section 5, the generation of the synthesized vector executed by the synthesized vector generating section 6 and the conversion processing executed by the color converting section 7 are performed for the respective colors to be converted. Of course, the colors to be converted may be any color in the first color gamut.

The color space used for the processing executed by the respective sections described above is not limited. Any of device-independent values such as L*a*b equal color space and XYZ color space, and device-dependent data such as CMYK and RGB may be used. Considering the gradation property of the color space after conversion, the L*a*b equal color space may used.

Figure 7:
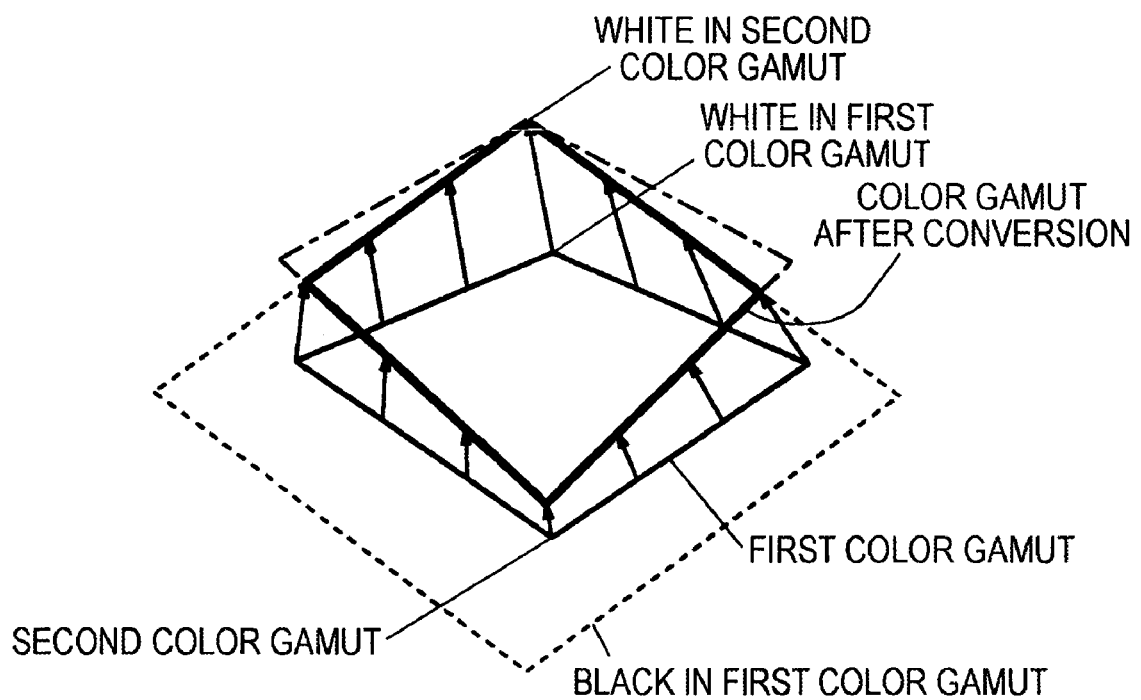
FIG. 7 is a schematic representation of another example of color gamuts before and after the color adjustment in a color adjustment apparatus and a color adjustment method according to another exemplary embodiment of the invention.

FIG. 7 is a schematic representation of another example of color gamuts before and after the color adjustment in a color adjustment apparatus and a color adjustment method according to another exemplary embodiment of the invention. The lines in FIG. 7 are similar to those shown in FIG. 2. FIG. 2 shows the example in which black is fixed so as to effectively utilize the second color gamut. The invention can also be applied to the case where color adjustment is made in such a manner that the whole first color gamut is moved (shifted) so that white of the fist color gamut coincides with white in the second color gamut.

In this case, white in the first color gamut is made to coincide with white in the second color gamut and the first color gamut is shifted using the shift vector at that time. An area outside the second color gamut appears as indicated by the alternate long and short dash line in FIG. 7. Thus, with regard to colors, which are placed outside the second color gamut by shifting the first color gamut so that white in the first color gamut coincides with white in the second color gamut, the color-pair generating section 3 associates an intersection between a segment connecting the colors before and after the shift (conversion) and the contour of the second color gamut with the color in the first color gamut before the shift, to generate a color pair. The colors, which are used to generate the color pairs, are similar to those in the above described exemplary embodiment.

The color pair thus generated may be used to perform processing of the vector generating section 4 and the subsequent sections in a similar manner to that described above. Accordingly, the colors in the first color gamut indicated by the thin solid line in FIG. 7 are converted into the colors in the second color gamut indicated by the thick solid line. Also in this case, unlike the relative conversion of the related art, it is prevented the adjusted colors from being placed outside the second color gamut. White becomes paper white. Therefore, color cast can be prevented. In comparison with the previous exemplary embodiment in which black is fixed, the second color gamut used in this exemplary embodiment is narrow.

The invention is not limited to the two exemplary embodiments described above. A method for adjusting (converting) to the second color gamut may be modified variously by changing how to give color pairs. For example, black in the first color gamut may be converted to coincide with black in the second color gamut. Alternatively, the adjustment may be executed so as to utilize the entire second color gamut.

Figure 8:
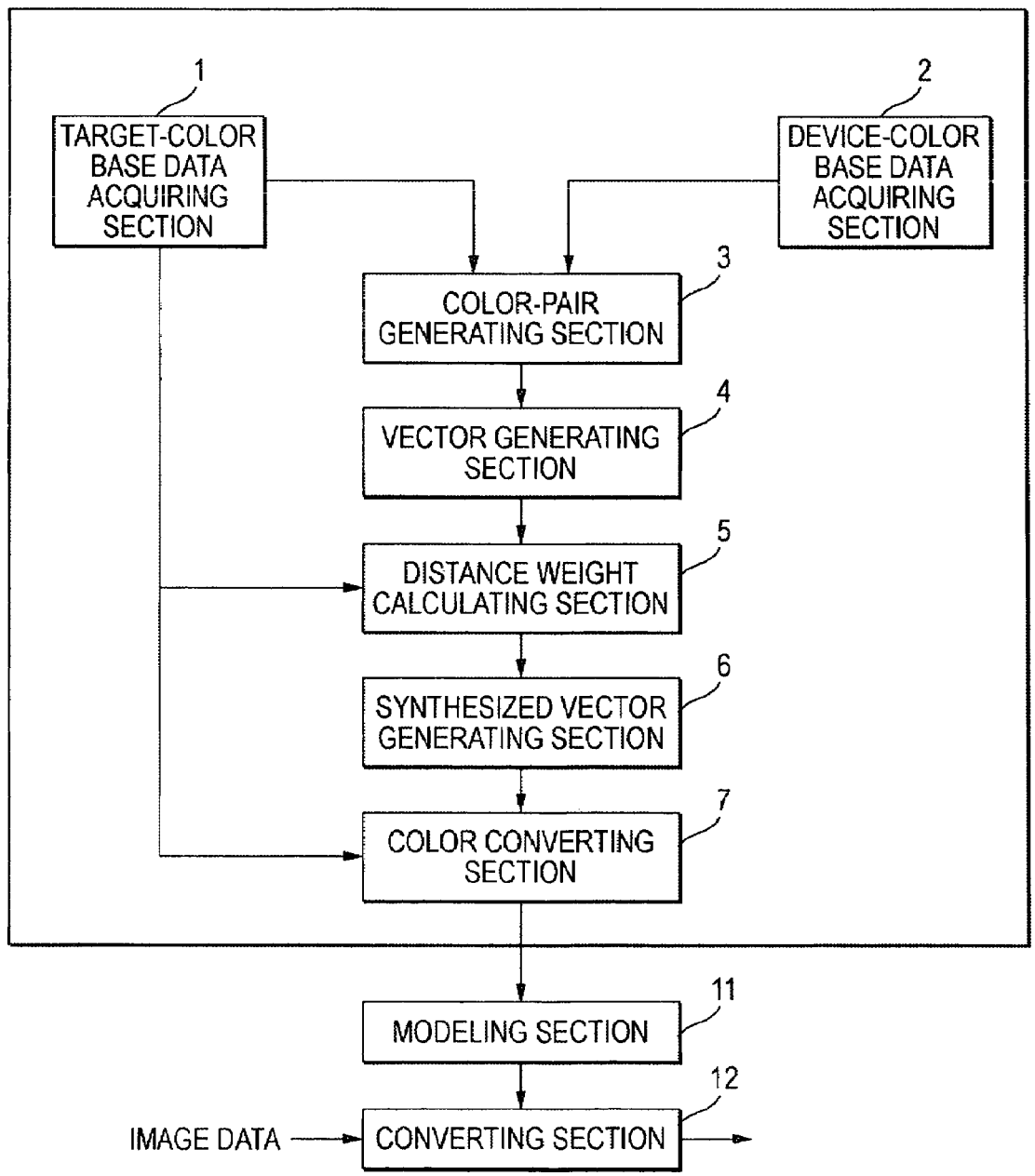
FIG. 8 is a block diagram to show a color-conversion-parameter generating apparatus and a color converting apparatus and a color conversion parameter generation method and a color conversion method according to further another exemplary embodiment of the invention.

FIG. 8 is a block diagram to show a color-conversion-parameter generating apparatus and a color converting apparatus and a color conversion parameter generation method and a color conversion method according to further another exemplary embodiment of the invention. In FIG. 8, numeral 11 denotes a modeling section and numeral 12 denotes a converting section. Here, process target colors, which are the target-color base data, are color-adjusted by the color adjustment apparatus or the color adjustment method shown in FIG. 1, and the adjusted target-color based data is given to the modeling section 11.

The modeling section 11 generates a color conversion model using the adjusted target-color base data after, and generates a color conversion parameter based on the color conversion model. The color conversion parameter is elements of a matrix, for example, if the conversion section 12 performs matrix operations. For example, if a direct lookup table with interpolation is used, a table value may be generated.

The conversion section 12 uses the color conversion parameter generated by the modeling section 11 to perform color conversion processing on image data, which is created for output with the first image output device.

When the image data provided by the conversion section 12 is output by the second image output device, color reproduction in the first image output device can be simulated by the second image output device.

It is not necessary to provide the modeling section 11 and the conversion section 12 in the same apparatus. Any configuration can be adopted in such a manner that the modeling section 11 of the color-conversion-parameter generating apparatus according to the exemplary embodiment of the invention and the conversion section 12 of the color converting apparatus according to the exemplary embodiment of the invention are separate and the color conversion parameter generated by the modeling section 11 is input to the apparatus in which the conversion section 12 is provided to execute color conversion. Of course, the color adjustment apparatus according to the exemplary embodiment of the invention and the modeling section 11 may be integrated into one, the modeling section 11 and the conversion section 12 may be integrated into one, or the components shown in FIG. 8 may be integrated into one.

Figure 9:
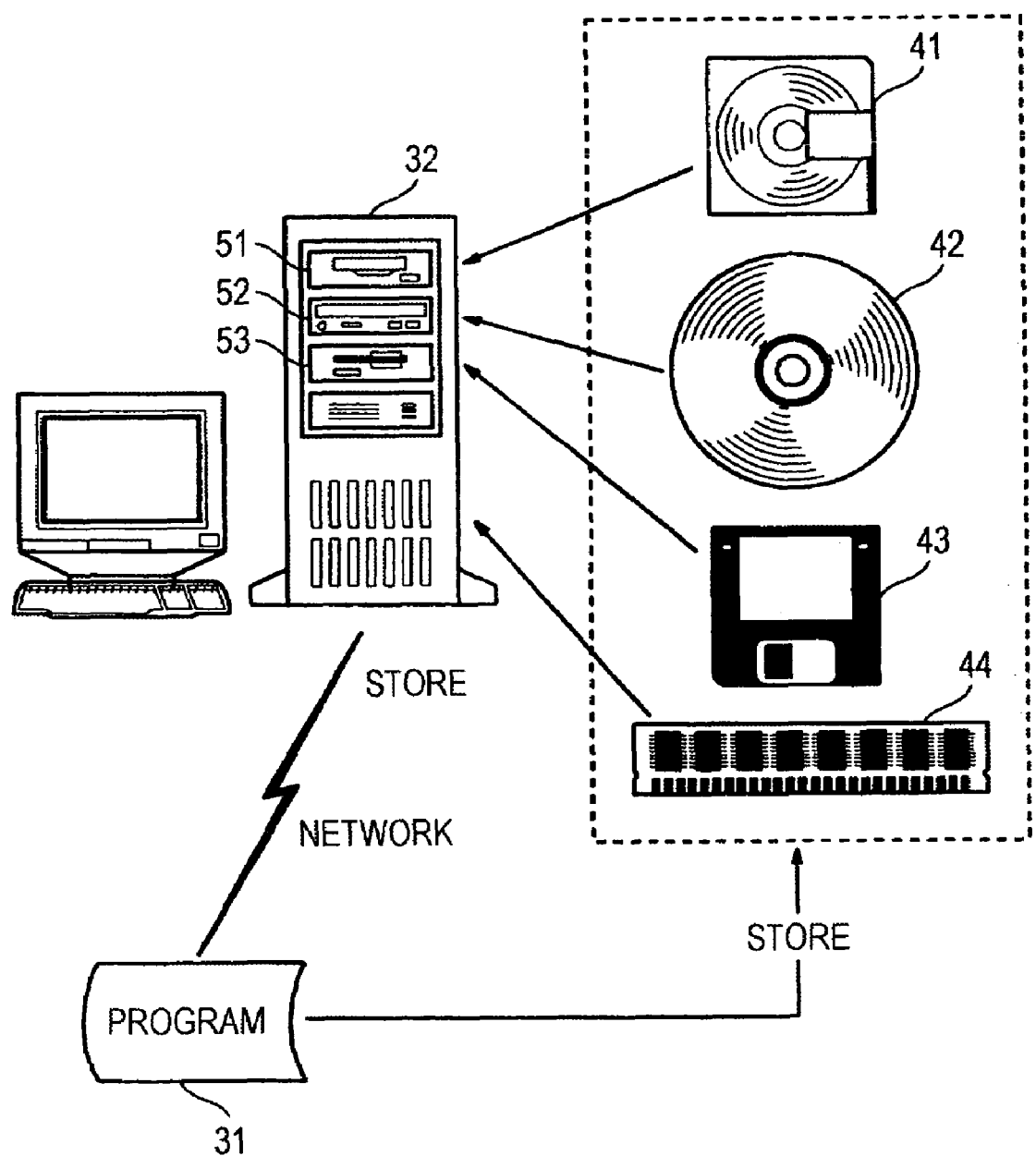
FIG. 9 is a schematic representation of an example of a computer program and a storage medium storing the computer program when the invention is embodied by the computer program.

FIG. 9 is a schematic representation of an example of a computer program and a storage medium storing the computer program when the function of the color adjustment apparatus of the invention or the color adjustment method of the invention, the function of the color-conversion-parameter generating apparatus of the invention or the color conversion parameter generation method of the invention, and the function of the color converting apparatus of the invention or the color conversion method of the invention are implemented as the computer program. In the figure, numeral 31 denotes a program, numeral 32 denotes a computer, numeral 41 denotes a magneto-optical disk, numeral 42 denotes an optical disk, numeral 43 denotes a magnetic disk, numeral 44 denotes memory, numeral 51 denotes a magneto-optical disk drive, numeral 52 denotes an optical disk drive, and numeral 53 denotes a magnetic disk drive.

Some or all of the functions of the sections described above in the exemplary embodiments can be implemented as the program 31 that can be executed by a computer. In this case, the program 31, the data used by the program (containing the target-color base data, the device-color base data, the conversion parameters, etc.), and the like can also be stored in a computer-readable storage medium. The storage medium is a medium that can cause a change state of energy of magnetism, light, electricity, etc., to occur in a reader included in the hardware resources of the computer in response to the description of the program and can transfer the description of the program to the reader in the format of the signal corresponding to the change state. For example, the storage medium is the magneto-optical disk 41, the optical disk 42 (containing a CD, a DVD, etc.,), the magnetic disk 43, the memory 44 (containing an IC card, a memory card, etc.,), etc. Of course, the storage media are not limited to portable media.

The program 31 is stored in any of the storage media and is placed in the magneto-optical disk drive 51, the optical disk drive 52, the magnetic disk drive 53, or a memory slot (not shown) of the computer 32, for example, whereby the program 31 can be read from the computer 32 for executing the function of the color adjustment apparatus of the invention or the color adjustment method of the invention, the function of the color-conversion-parameter generating apparatus of the invention or the color conversion parameter generation method of the invention, and the function of the color converting apparatus of the invention or the color conversion method of the invention. Alternatively, a storage medium may be previously placed in the computer 32 and the program 31 may be transferred to the computer 32 through a network, etc., for example, and may be stored in the storage medium for execution.

Of course, some functions can also be implemented as hardware or all may be implemented as hardware. Alternatively, the function of the color adjustment apparatus of the invention or the color adjustment method of the invention and the function of the color-conversion-parameter generating apparatus of the invention or the color conversion parameter generation method of the invention or the function of the color-conversion-parameter generating apparatus of the invention or the color conversion parameter generation method of the invention and the function of the color converting apparatus of the invention or the color conversion method of the invention and further all these can also be put into software collectively or they can also be configured as a program incorporating the invention together with other components. For example, the conversion section 12 can also be configured as one program together with a control program in a copier or an image formation apparatus. Of course, to apply to another use, they can also be integrated with a program in the use.

What is claimed is:

1. A color adjustment apparatus comprising:
   a pair generating section that generates plural pairs of a plurality of colors in a first color gamut and a plurality of colors in a second color gamut, which correspond to the colors in the first color gamut, respectively, wherein one of the pairs includes white in the first color gamut;
   a vector generating section that generates a plurality of vectors connecting each color in the first color gamut and each color in the second color gamut, which belong to a generated pair;
   a weight calculating section that calculates weights in accordance with distances between each color, which is to be processed and is in the first color gamut, and origins of the generated vectors;
   a synthesized-vector generating section that applies each calculated weight to the corresponding vector to generate a synthesized vector; and
   a color converting section that converts a color, in the first color gamut, to be processed into a color in the second color gamut, using the synthesized vector.

2. The apparatus according to claim 1, wherein the pairs generated by the pair generating section include a pair of a black point in the first color gamut and a point in the second color gamut corresponding to the black point.

3. The apparatus according to claim 1, wherein the generated pairs include pairs of a plurality of colors on a contour of the first color gamut and corresponding colors on the contour of the second color gamut.

4. The apparatus according to claim 1, wherein the generated pairs include a pair of (i) a skin color or a sky blue in the first color gamut and (ii) a color in the second color gamut, which corresponds to the skin color or the sky blue.

5. The apparatus according to claim 1, wherein if a color conversion, which converts white in the first color gamut into white in the second color gamut, converts one of the colors in the first color gamut, which belong to the generated pairs, into a color outside the second color gamut, the pair generating section generates a pair of the one of the colors in the first color gamut and a intersection between (i) a segment connecting the one of the colors in the first color gamut and the color into which the one of the colors in the first color gamut is converted and (ii) a contour of the second color gamut.

6. The apparatus according to claim 1, wherein:
   the first color gamut is a color reproduction area of a first image output device, which is a color reproduction target device of an image, and
   the second color gamut is a color reproduction area of a second image output device that outputs the image.

7. The apparatus according to claim 6, wherein the generated pairs include pairs of (i) primary colors in the first image output device, each of which has a maximum saturation, and (ii) colors corresponding to the primary colors having the maximum saturations.

8. The apparatus according to claim 6, wherein the generated pair include:
   pairs of (i) primary colors in the first image output device, each of which has a maximum saturation, and (ii) colors corresponding to the primary colors having the maximum saturations; and
   pairs of (i) secondary colors in the first image output device, each of which has a maximum saturation, and (ii) colors corresponding to the secondary colors having the maximum saturations.

9. The apparatus according to claim 6, wherein the generated pairs further include a pair of process black in the first image output device and the a color in the second image output device, which corresponds to the process black.

10. The apparatus according to claim 6, further comprising:
    a first acquiring section that acquires base data, which describes an output characteristic of the first image output device; and
    a second acquiring section that acquires base data, which describes an output characteristic of the second image output device, wherein:
    the pair generating section generates the pairs based on the base data acquired by the first acquiring section and the base data acquired by the second acquiring section.

11. The apparatus according to claim 10, wherein:
    the base data acquired by the first acquiring section describes a correspondence relation between first device-dependent input data and output data in a device-independent color space, which the first image output device outputs in response to the first device-dependent input data, and
    the base data acquired by the second acquiring section describes a correspondence relation between second device-dependent input data and a color in the device-independent color space, which the second image output device outputs in response to the second device-dependent input data.

12. The apparatus according to claim 10, wherein:
    the base data acquired by the first acquiring section describes a correspondence relation between first device-dependent input data and output data in a device-dependent color space, which the first image output device outputs in response to the first device-dependent input data, and the base data acquired by the second acquiring section describes a correspondence relation between second device-dependent input data and a color in the device-dependent color space, which the second image output device outputs in response to the second device-dependent input data.

13. The apparatus according to claim 11, wherein the first acquiring section acquires the base data, which describes the output characteristic of the first image output device, from ICC profile information.

14. The apparatus according to claim 11, wherein the second acquiring section acquires the base data, which describes the output characteristic of the second image output device, from ICC profile information.

15. The apparatus according to claim 1, wherein the pair generating section generates the pairs based on colors designated by a user.

16. A color adjustment method comprising:
generating plural pairs of a plurality of colors in a first color gamut and a plurality of colors in a second color gamut, which correspond to the colors in the first color gamut, respectively, wherein one of the pairs includes white in the first color gamut;
generating a plurality of vectors connecting each color in the first color gamut and each color in the second color gamut, which belong to a generated pair;
calculating weights in accordance with distances between each color, which is to be processed and is in the first color gamut, and origins of the generated vectors;
applying each calculated weight to the corresponding vector to generate a synthesized vector; and
converting a color, in the first color gamut, to be processed into a color in the second color gamut, using the synthesized vector.

17. The method according to claim 16, wherein the generated pairs include a pair of a black point in the first color gamut and a point in the second color gamut corresponding to the black point.

18. The method according to claim 16, wherein the generated pairs include pairs of a plurality of colors on a contour of the first color gamut and corresponding colors on the contour of the second color gamut.

19. The method according to claim 16, wherein the generated pairs include a pair of (i) a skin color or a sky blue in the first color gamut and (ii) a color in the second color gamut, which corresponds to the skin color or the sky blue.

20. The method according to claim 16, wherein if a color conversion, which converts white in the first color gamut into white in the second color gamut, converts one of the colors in the first color gamut, which belong to the generated pairs, into a color outside the second color gamut, the generating generates a pair of the one of the colors in the first color gamut and a intersection between (i) a segment connecting the one of the colors in the first color gamut and the color into which the one of the colors in the first color gamut is converted and (ii) a contour of the second color gamut.

21. The method according to claim 16, wherein:
the first color gamut is a color reproduction area of a first image output device, which is a color reproduction target device of an image, and
the second color gamut is a color reproduction area of a second image output device that outputs the image.

22. The method according to claim 21, wherein the generated pairs include pairs of (i) primary colors in the first image output device, each of which has a maximum saturation, and (ii) colors corresponding to the primary colors having the maximum saturations.

23. The method according to claim 21, wherein the generated pair include:
pairs of (i) primary colors in the first image output device, each of which has a maximum saturation, and (ii) colors corresponding to the primary colors having the maximum saturations; and
pairs of (i) secondary colors in the first image output device, each of which has a maximum saturation, and (ii) colors corresponding to the secondary colors having the maximum saturations.

24. The method according to claim 21, wherein the generated pairs further include a pair of process black in the first image output device and the a color in the second image output device, which corresponds to the process black.

25. The method according to claim 21, further comprising:
acquiring first base data, which describes an output characteristic of the first image output device; and
acquiring second base data, which describes an output characteristic of the second image output device, wherein:
the generating generates the pairs based on the acquired first base data and the acquired second base data.

26. The method according to claim 25, wherein:
the acquired first base data describes a correspondence relation between first device-dependent input data and output data in a device-independent color space, which the first image output device outputs in response to the first device-dependent input data, and
the acquired second base data acquired describes a correspondence relation between second device-dependent input data and a color in the device-independent color space, which the second image output device outputs in response to the second device-dependent input data.

27. The method according to claim 25, wherein:
the acquired first base data describes a correspondence relation between first device-dependent input data and output data in a device-dependent color space, which the first image output device outputs in response to the first device-dependent input data, and
the acquired second base data describes a correspondence relation between second device-dependent input data and a color in the device-dependent color space, which the second image output device outputs in response to the second device-dependent input data.

28. The method according to claim 26, wherein the acquiring of the first base data acquires the first base data, which describes the output characteristic of the first image output device, from ICC profile information.

29. The method according to claim 26, wherein the acquiring of the second base data acquires the second base data, which describes the output characteristic of the second image output device, from ICC profile information.

30. The method according to claim 16, wherein the generating generates the pairs based on colors designated by a user.

31. A color-conversion-parameter generating apparatus for generating a color conversion parameter to convert a first color signal, which is created for being output as an image by a first image output device, into a second color signal to be output as an image by a second image output device, the apparatus comprising:
a base-data converting section that converts base data, which describes output characteristic of the first image output device, by the color adjustment apparatus according to claim 1; and a modeling section that generates a color conversion model using the base data converted by the base-data converting section, the modeling section that generates a color conversion parameter.

32. A color conversion parameter generation method for generating a color conversion parameter to convert a first color signal, which is created for being output as an image by a first image output device, into a second color signal to be output as an image by a second image output device, the color method comprising:
converting base data, which describes output characteristic of the first image output device, by the color adjustment method according to claim 16;
creating a color conversion model using the base data converted by the base-data converting section, and generating a color conversion parameter.

33. A color converting apparatus for converting a first color signal, which is created for being output as an image by a first image output device, into a second color signal to be output as an image by a second image output device, the comprising:
a converting section that converts the first color signal into the second color signal using the color conversion parameter generated by the color-conversion-parameter generating apparatus according to claim 31.

34. A color conversion method for converting a first color signal, which is created for being output as an image by a first image output device, into a second color signal to be output as an image by a second image output device, the method comprising:
converting the first color signal into the second color signal using the color conversion parameter generated by the color conversion parameter generation method according to claim 32.

35. A computer-readable medium storing a program causing a computer to execute a process for color adjustment, the process comprising:
generating plural pairs of a plurality of colors in a first color gamut and a plurality of colors in a second color gamut, which correspond to the colors in the first color gamut, respectively, wherein one of the pairs includes white in the first color gamut;
generating a plurality of vectors connecting each color in the first color gamut and each color in the second color gamut, which belong to a generated pair;
calculating weights in accordance with distances between each color, which is to be processed and is in the first color gamut, and origins of the generated vectors;
applying each calculated weight to the corresponding vector to generate a synthesized vector; and
converting a color, in the first color gamut, to be processed into a color in the second color gamut, using the synthesized vector.

36. A computer-readable medium storing a program causing a computer to execute a process for generating a color conversion parameter to convert a first color signal, which is created for being output as an image by a first image output device, into a second color signal to be output as an image by a second image output device, the process comprising:
converting base data, which describes output characteristic of the first image output device, by causing the computer to execute the process stored in the medium according to claim 35;
creating a color conversion model using the base data converted by the base-data converting section, and generating a color conversion parameter.

37. A computer-readable medium storing a program causing a computer to execute a process for converting a first color signal, which is created for being output as an image by a first image output device, into a second color signal to be output as an image by a second image output device, the process comprising:
converting the first color signal into the second color signal using the color conversion parameter generated by causing the computer to execute the process stored in the medium according to claim 36.

* * * * *